United States Patent [19]
Maurer et al.

[11] Patent Number: 6,023,951
[45] Date of Patent: Feb. 15, 2000

[54] METHOD OF SECURING AGAINST THEFT OF GOODS AND DEVICE FOR CARRYING OUT SAID METHOD

[75] Inventors: Albert Maurer, Lindenhofstrasse 14, CH-8624 Grüt; Urs Meyer, Niederglatt, both of Switzerland

[73] Assignee: Albert Maurer, Grüt, Switzerland

[21] Appl. No.: 09/125,501

[22] PCT Filed: Jan. 29, 1997

[86] PCT No.: PCT/CH97/00027

§ 371 Date: Aug. 19, 1998

§ 102(e) Date: Aug. 19, 1998

[87] PCT Pub. No.: WO97/31170

PCT Pub. Date: Aug. 28, 1997

[30] Foreign Application Priority Data

Feb. 22, 1996 [CH] Switzerland .............................. 466/966

[51] Int. Cl.[7] .................................................. E05B 65/00
[52] U.S. Cl. ............................ 70/57.1; 705/16; 705/276; 335/306
[58] Field of Search ............................ 361/147; 70/57.1, 70/276; 292/251.1; 335/306, 302; 340/572.1, 572.6; 705/16

[56] References Cited

U.S. PATENT DOCUMENTS

| | | | |
|---|---|---|---|
| 4,339,853 | 7/1982 | Lipschitz | 70/57.1 |
| 4,497,011 | 1/1985 | Hurtig | 361/147 |
| 4,523,356 | 6/1985 | Charlot, Jr. | |
| 4,527,310 | 7/1985 | Vandebult | 70/57.1 |
| 4,651,136 | 3/1987 | Anderson et al. | 70/57.1 |
| 4,774,503 | 9/1988 | Bussard | |
| 5,111,394 | 5/1992 | Hilles et al. | 705/16 |
| 5,572,191 | 11/1996 | Lundberg | 70/57.1 |

*Primary Examiner*—Darnell M. Boucher
*Attorney, Agent, or Firm*—Pauley Petersen Kinne & Fejer

[57] ABSTRACT

An apparatus and method for using a permanent magnet with a high coercive force and a permanent pole-reversible magnet with a low coercive force used in securing members in cooperation with wedging members. The apparatus also includes a release device, with a securing member inserted, and a combined control and feed device and a verification device, in the form of a till. The entire release device can therefore be, for example, directly linked to invoicing for a paid sum. The control and feed device controls and feeds the electromagnet coil of the magnetizing device. To release a securing member, the magnetizing device is activated, thereby reversing the poles of the permanent pole-reversible magnet. Both permanent magnets in the securing member subsequently repel, the wedge is released and the pin can be withdrawn from the locking section.

13 Claims, 3 Drawing Sheets

METHOD OF SECURING AGAINST THEFT OF GOODS AND DEVICE FOR CARRYING OUT SAID METHOD The invention relates to a method for securing goods against theft according to the preamble of the dependent claim and a device for carrying out the method with a securing element and release apparatus.

On the market magnetically releasable theft securements are known and widely employed. The goods to be protected, for example clothes are provided with a distinguishing mark, a so-called tag. This tag consists of a retaining part and a pin which is inserted through the goods and retained in the retaining part. The pin and retaining part are thus unreleasably attached to the article to be protected. The pin in the retaining part is secured against withdrawal in that it is pushed through two wedging elements in the form of flat or curved metal platelets which wedge against one another and thus with respect to the pins. The wedging is effected by way of a slight spring force and/or by small balls between the two metal platelets. With a strong release magnet as a release apparatus the metal platelets or the small balls may be pulled laterally from the outside without contact, upon which the pin is released and may be pulled rearwards from the article. The tags may additionally be provided with colour containers and/or with induction coils. In any case they are designed such that a forced separation of the tag from the article leads to a destruction or at least to considerable damage to the article.

All these theft securements do not however protect from the considerable thefts which are carried out by the sales personnel themselves or those with their support. These theft securements may be released with every release magnet or perhaps with any strong permanent magnet without the article getting damaged.

It is the object of the invention to provide a method for securing goods against theft which renders impossible an unauthorised release of such a type of theft securement by using permanent magnets of all types. Likewise a device for carrying out the method belongs to the object of the invention.

The object is achieved by the invention specified in the patent claims.

An additional advantage of the invention is that the release of the theft securement is made dependent on the payment or on a control function at the till.

A further advantage of the invention results in that the theft of goods by way of unauthorised releasing of the theft securements by sales personnel or with the support of personnel is made impossible or at least significantly reduced.

The invention is hereinafter described in more detail in the context of the drawings. There are shown:

The method according to the invention for securing goods against theft is now described in more detail in combination with the FIGS. 1 to 5.

Figure 1:
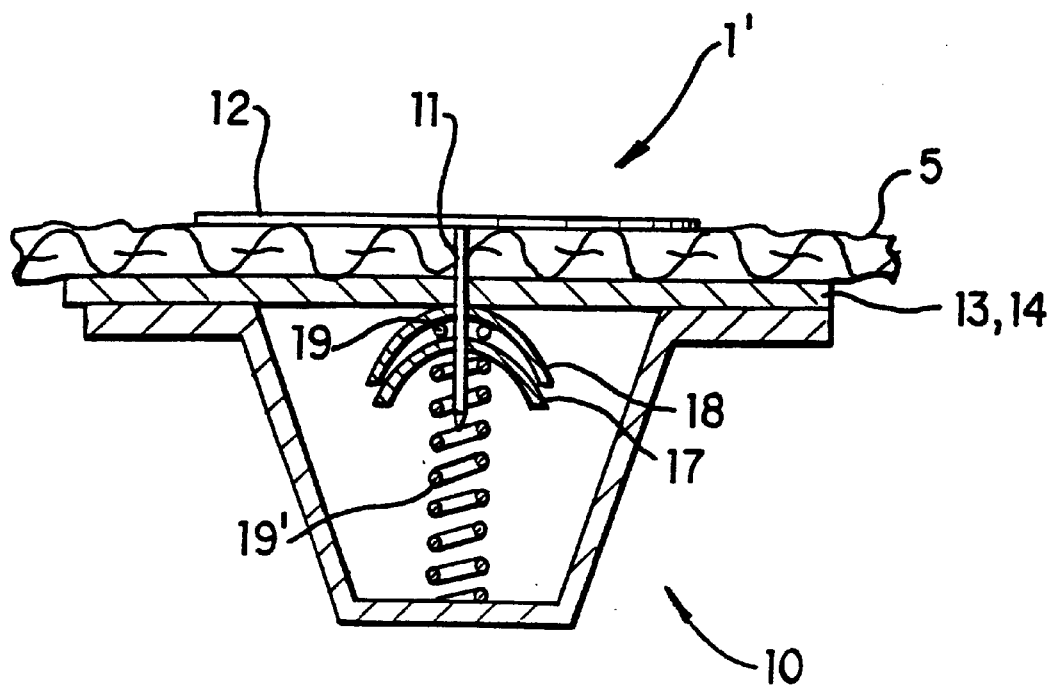
FIG. 1 shows a theft securement according to the state of the art.

In FIG. 1 a theft securement according to the state of the art is shown. The goods 5 to be protected, for example clothing, with such a theft securement, are provided with a so-called tag as a securing element. This tag consists of a retaining part 10 and a pin 11 which comprises a broad head 12. The pin 11 is pushed through the article and is retained in the retaining part 10 and secured against withdrawal. For this it is pushed through two wedge elements 17, 18 in the form of flat or curved metal platelets which wedge against one another and thus with respect to the pins 11. The wedging is effected under the effect of a retaining force field, here by a slight spring pressure and/or by small balls 19 between the two metal platelets. A spring 19' ensures that the wedging elements always have the tendency to wedge against one another and against an inserted pin 11. In a release apparatus with its own strong release magnet the metal platelets or the small balls may be pulled laterally from the outside, upon which the pin is released and is pulled rearwards out of the secured article 5 and may be removed. This means that the wedging of the wedging elements 17, 18 may be released under the effect of an external magnetic field. The locking of the pin against withdrawal in a locking condition is thus effected by the clamping elements under the effect of a force field exerted by the spring. During the release the wedging elements are located in a releasing condition likewise under the effect of a force field acting from the outside produced by the release magnet, a releasing magnetic field.

The tag as is known may be additionally provided with an induction coil for controlling an authorised carrying away. Also colour containers and other means for destroying the secured article may be attached thereto. This of course also applies to all theft securements according to the new invention.

Figure 2:
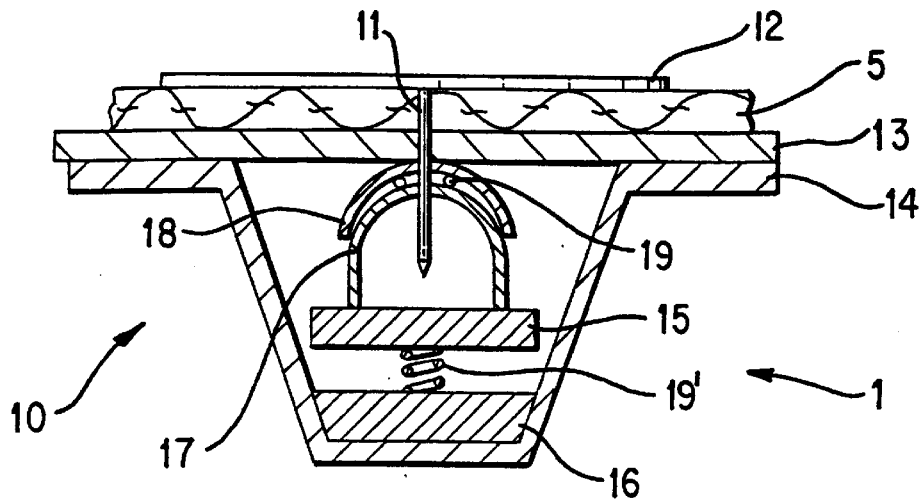
FIG. 2 shows a theft securement according to the invention in a first variant, in cross section.
Figure 3:
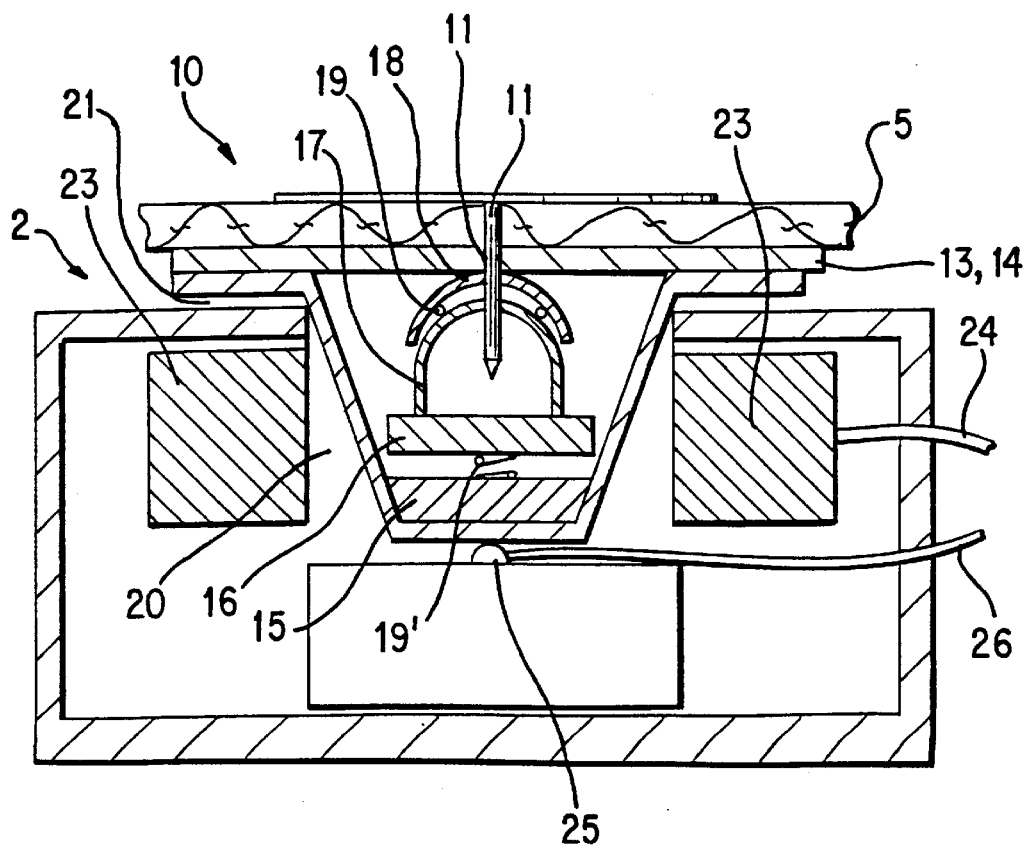
FIG. 3 shows an associated release apparatus with an inserted theft securement during the release procedure, in cross section.

With the new method according to the invention which can be seen from FIGS. 2 to 5 in combination it is then decisive that the wedgable wedge elements 17, 18 are tensioned against one another with the help of a permanent retaining magnetic field as a retaining force field in the retaining part 10. This is produced by two permanent magnets themselves arranged in the locking part. By changing the magnetic field in a suitably formed release apparatus 2 by way of a short magnetising impulse of "attraction" to "repulsion" the wedging becomes releasable. This is made possible in that the wedge elements 17, 18 are designed in acting connection with permanent magnets. Specifically a first wedge element 17 is in acting connection with a first permanent magnet 15 of permanent-magnetically reversely polable material and a second wedge element 18 with a second permanent magnet 16 of magnetically unpolable material. At the same time one of the two permanent magnets 15 or 16 is in mechanical contact with one of the wedging elements 17 or 18. By way of magnetic shielding of the reversely polable magnet the required magnetising strength may be set in that suitable materials are selected and by way of suitable forming and shaping of the housing parts 13 and 14. The reverse poling of the reversely polable permanent magnet is effected by a magnetising element 30 in the release apparatus 2. This consists of an electromegnetic coil which for the release procedure is activated once for a short time. This is shown in FIG. 3 and described further below. With a suitable triggering it is possible to make the control of the activation or the release procedure for such a securing element dependent on a till or on other control apparatus via a control signal. For example this may be effected such that an amount or even a certain amount is typed into the till and a receipt must be given in order to release the activation. Also a release of the securing element on automatic debitting of the purchasing cost from an account or likewise is also conceivable.

In FIG. 2 a theft securement according to the invention is represented. The decisive differences with respect to the state of the art can be clearly seen. A securement element consists as with the state of the art of a pin 11 with a broad head 12. The pin 11 is inserted through the article to be secured so that the broad head 12 comes to bear on the article on one side. The pin 11 is then on the other side of the article 5 inserted into the retaining part 10 and is releasably anchored. The locking part 10 comprises a housing with a housing floor 13 which here bears on the article 5, and of a housing lid 14. Between the housing floor 13 and the housing lid 14 there is located a hollow space which serves for receiving the further securing elements. The pin 11 now pierces the housing floor 13 and subsequently the first wedging element 17 and the second wedging element 18 and by way of this and by way of the securing elements 19 is held wedged in the retaining part 10. New is that the first wedge element 17 is rigidly connected to a first permanent magnet 15. It is important that this first permanent magnet 15 consists of a low-coercive material and thus can be demagnetised or is even reversible in its poling (N-S), thus is reversely polable. At a distance from the first permanent magnet 15 there is located a second permanent magnet 16. The second permanent magnet 16 is fastened in the housing lid 14 and magnetically where appropriate shielded in this position by the housing lid 14. It further consists of highly coercive material. It therefore can be reversely poled and keeps its poling (N-S). Between these two permanent magnets there is located a small spring which supports the force causing the wedging produced by the permanent magnets and secures the loose wedging elements 17, 18 against slipping. In the case of the closed securing element than the first permanent magnet 15 and the second permanent magnet 16 are poled such that the same pole, that is N-N or S-S lies opposite and the permanent magnets repel one another. By way of this the wedging elements 17 and 18 are pressed together, wedge against one another and securely hold the pin 11. The article is secured. The housing floor would advantageously contain iron and thus additionally serves as a magnetic shielding during the release procedure described further below.

The condition during the releasing of the securing elements is shown in combination with an associated release apparatus 2.

The release apparatus 2 comprises a magnetising element 21 in a housing which magnetically shields to the outside. Above there is present an opening 20 for inserting a retaining part 10. In the release apparatus 20 there is located an electromagnetic coil 23. The electromagnetic coil is arranged such that it encloses the inserted retaining part 10 in the region of its permanent magnets 15, 16. Furthermore in the magnetising element 20 there is arranged a microswitch 25 in a manner such that on insertion of the retaining part 10 it is actuated and closes a circuit. By way of this the circuit is then released for operation of the electromagnet. The electromagnet 23 of the magnetising element 20 is connected to a control and supply apparatus via a supply line 24.

The magnetising apparatus 20 then magnetises the heavily coercive permanent magnet 15 in the retaining part 10 and by way of this demagnetises or reversely poles this. Then the two permanent magnets 15 and 16 attract one another and the wedging by wedging elements 17, 18 is released. The pin 11 may be withdrawn from the retaining part 10 and thus from the secured article 5.

Tags which are released by reversely poling the reversely polable permanent magnet for releasing the securing element remain in this condition. They are inactivated. The tags must therefore for renewed use as a securing element be activated again. This is effected by reversely poling the heavily coercive permanent magnet once again. This may be effected in the same magnetising arrangement which is however reversely controlled with respect to field or in a separate magnetising arrangement. Only after such a new reverse magnetising, after which the two permanent magnets 15 and 16 again are attracted, are the tags activated for a renewed use.

The activated tags may again be used afresh for securing goods. The pin 11 is pushed through the article and inserted into the retaining part 10. The wedging by the wedging elements is effected as usual by itself after the assembly.

Figure 4:
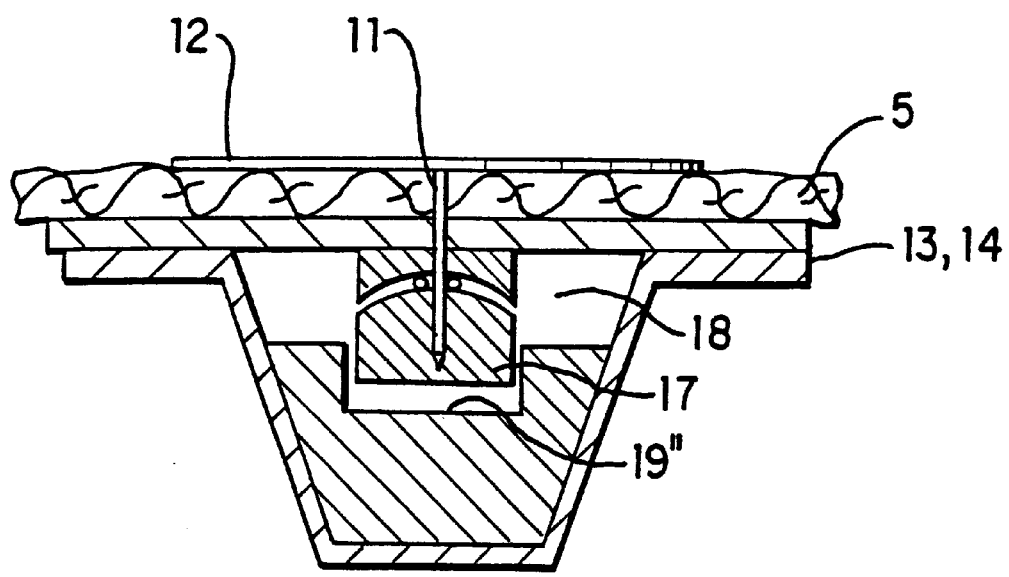
FIG. 4 shows a theft securement according to the invention in a preferred variant, in cross section.

In FIG. 4 there is shown a preferred embodiment form of the securement element according to the invention. In order to minimise the number of individual parts the wedge elements 17, 18 themselves are formed as permanent magnets. Since the permanent magnet material is brittle it is recommended to design the wedging elements 17, 18 more solidly and not only in the form of thin metal sheet parts. The manner of functioning is of course identical to the previously described variant. With this preferred variant the first wedging element 17 may be designed as a low-coercive permanent magnet and the second wedging element 18 as a high-coercive first permanent magnet 15. Or the second wedging element 18 may be designed as a low-coercive second permanent magnet 16 and the first wedging element 17 as a high-coercive first permanent magnet 15. Again it is recommended to arrange a small spring 19' which is not shown, or also a guide 19" which is shown, in the retaining part in a manner such that it prevents the displaceable wedging elements 17, 18 formed as permanent magnets 15, 16 from sliding apart too far. However between the guide 19" and the wedging elements 17, 18 there must be some play present so that the wedging and the releasing of the wedging may be carried out.

Figure 5:
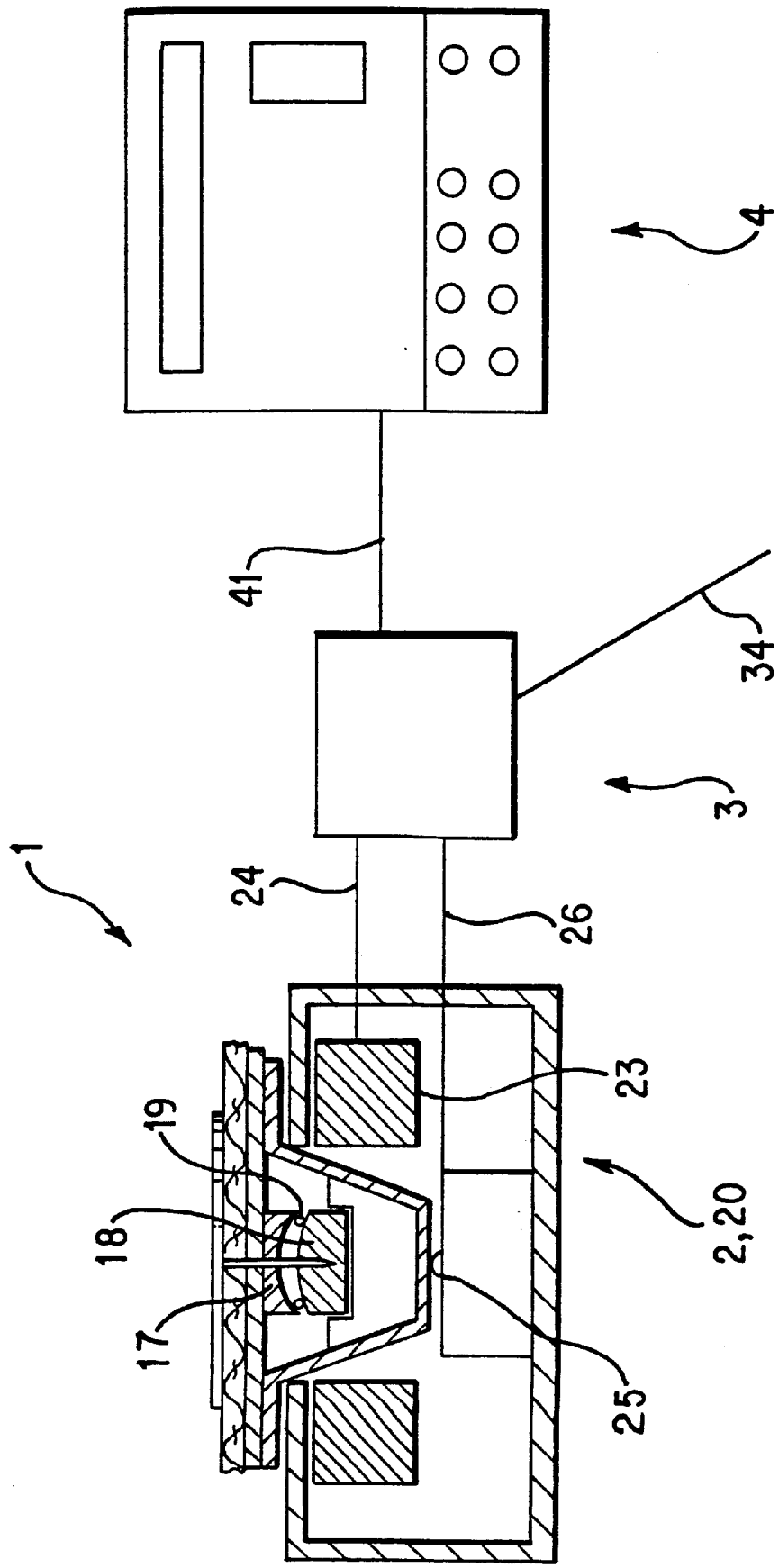
FIG. 5 shows a block diagram of the cooperation and arrangement of the release apparatus, the theft securement, the control and the release function at the till.

In FIG. 5 then the complete device for carrying out the method, with a theft securement 1 and release apparatus 2 is shown in an overview. The device consists of the release apparatus 2, here shown with an inserted securing element 1, and of a control-supply apparatus as well as a controlling apparatus, here in the form of a till 4. At the same time the control and supply apparatus 3 is connected on the one hand to the microswitch 25 via the lead 26 and on the other hand to the magnetising coil 23 of the magnetising element 20 via the supply lead 24. The control and supply apparatus 3 is connected to the network of the electricity supply via the supply lead 34. It is clear that such a magnetising apparatus during the activation requires energy for a very short time during activation. In this period of time there flows the current required for reverse poling a reversely polable permanent magnet. During the short time of the reverse poling or the magnetising procedure there exists within the magnetising element 20 a strong magnetic field. This must be well shielded to the outside. Accordingly the magnetising element 20 is provided with a magnetic shielding. The opening with an inserted retaining part 10 is closed by the rear plate 13 thereof and thus the shielding may be completed via a contact zone 21. The design of the rear plate 13 of an iron-containing and conductive material further permits the inclusion of an additional electrical contact function for controlling or the fuse protection of the release apparatus in that with an inserted retaining part the rear plate thereof is in contact with the shielding of the release apparatus. In this manner it is achieved that with an inserted retaining part 10 the release apparatus or the magnetising unit 20 is magnetically shielded to the outside as much as possible so that outside the release apparatus no magnetic influences may arise.

Via a lead 41 the control and supply apparatus may be connected to a controlling apparatus, here a till 4, this permitting further controlling and control possibilities. By way of this it is possible to render any releasing of such securing elements dependent on a certain action at the till 4 in that only by way of this action the control and supply apparatus is temporarily released or is activated. It may be so advanced that the correct price of the article which may be indicated for example in a bar code on the tag itself, is typed into the till and even given a receipt as received, before the release apparatus 2 is activated for the article concerned and the securing element can be removed. Instead of a till 4 also a credit card reader or something similar may be applied with a corresponding function.

For activating deactivated retaining parts 10 either the same release apparatus 2 may be used, wherein however the magnetising must be carried out with a poling which is reverse with respect to the releasing. It may however also be advantageous to carry out the activation of the retaining parts in a special activation unit analogously to the release apparatus. By way of this the attachment of the tag may for instance be limited to authorised persons and likewise.

We claim:

1. In a method for securing an article (5) against theft wherein a pin (11) having a broad head is pushed through the article (5) to be secured and on an opposite side of the article (5) is inserted into a retaining part (10), wherein the pin (11) is held in the retaining part (10) under an effect of a retaining force field by at least two wedging elements (17, 18) which can be wedged against one another and against the pin (11), and the pin (11) is secured against withdrawal, the article (5) is released by the wedging elements (17, 18) being released by the magnetic field so that the pin (11) may be removed from the retaining part (10) and from the secured article (5), the improving comprising:

two permanent magnets (15, 16) producing a retaining force field and the releasing magnetic field, the permanent magnets (15, 16) arranged in the retaining part (10), wherein the retaining force field for attaching the pin (11) and the retaining part (10) on the article (5), by way of magnetic pole reversal of one of the permanent magnets (15 or 16), becomes a releasing magnetic field.

2. In a method according to claim 1, wherein the pole reversal of one of the permanent magnets (15 or 16) is effected in a magnetising element (20) in which the retaining part (10) is inserted.

3. In a method according to claim 2, wherein the magnetising element (20) is activated by a till via a control signal.

4. In a method according to claim 3, wherein the control signal is only released upon one of a registration and producing a receipt of purchase of the secured article (5).

5. In a device for securing an article (5) against theft, the device having securing elements and a release apparatus, wherein each of the securing elements (1) comprises a pin (11) which can be pushed through the article (5) and a retaining part (10) having at least two wedging elements (17, 18) wedgable against one another and against the pin (11), the wedging of the wedging elements (17, 18) operates under an effect of a retaining force field which can be released by a releasing magnetic field induced by the release apparatus, the improvement comprising: the retaining part (10) having a first permanent magnet (15) and a second permanent magnet (16) for producing the retaining magnetic field which draws the wedging elements towards one another and for producing the releasing magnetic field for drawing the wedging elements away from one another.

6. In a device according to claim 5, the one permanent magnet (15) comprises a high-coercive material and the second permanent magnet (16) comprises a low-coercive, magnetically reversely polable material.

7. In a device according to claim 5, wherein the retaining magnetic field can be reversed poled into the releasing magnetic field by magnetic reverse poling of one of the permanent magnets (15, 16).

8. In a device according to claim 5, wherein the wedging elements (17, 18) are the first and second permanent magnets (15, 16).

9. In a device according to claim 5, wherein the release apparatus (2) comprises a magnetising element (20) with an electromagnetic coil (23) and a control and supply (3) for the magnetising element (20), for the reverse poling of the reversely polable permanent magnet (16).

10. In a device according to claim 9, wherein a microswitch (25) connects the magnetising element (20) to the control and supply (3) so that the magnetising element (20) can only be activated by inserting the retaining part (10) into the release apparatus.

11. In a device according to claim 9, wherein the control and supply (3) is controllable by one of a registering apparatus and a till (4).

12. In a device according to claim 9, wherein the release apparatus (2) is magnetically shielded.

13. In the device of according to claim 5, wherein at least one of the permanent magnets (15, 16) is in mechanical connection with one of the wedging elements (17, 18).

* * * * *